Figure 3:
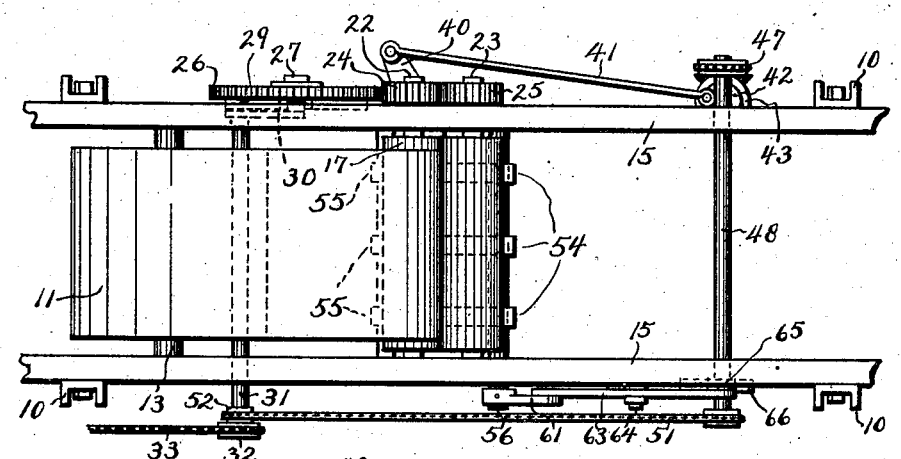

Feb. 22, 1927.
G. A. BRESETT
1,618,167
WEB FEEDING AND CUTTING MECHANISM
Filed Jan. 5, 1926     2 Sheets-Sheet 1
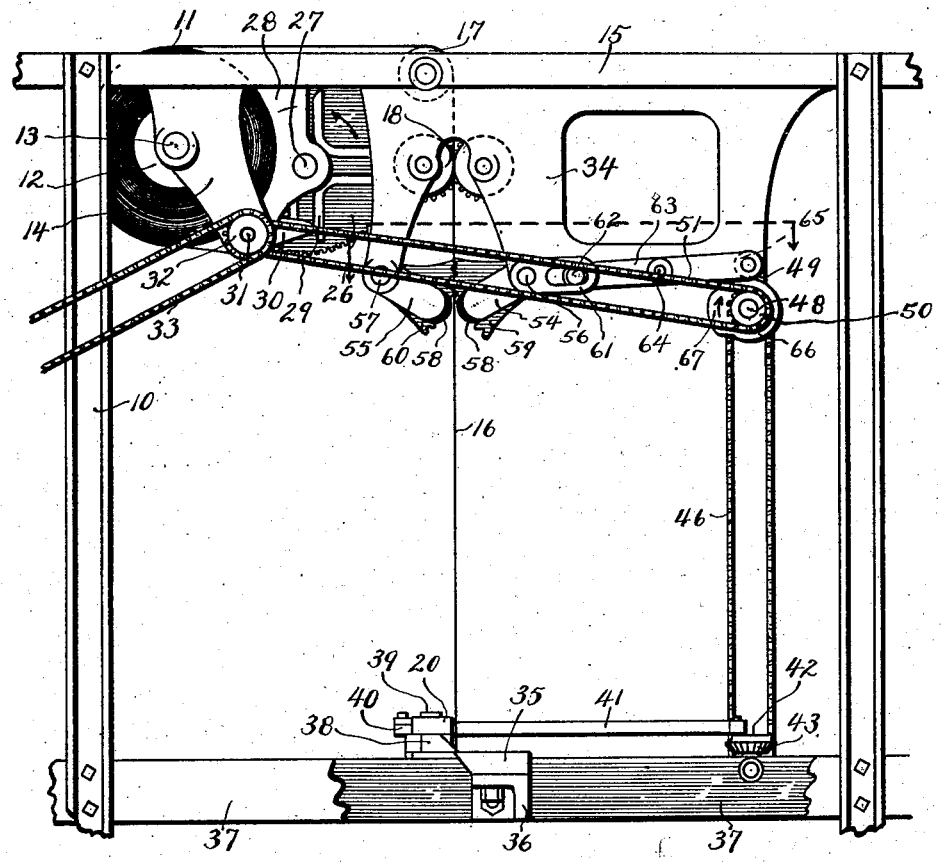
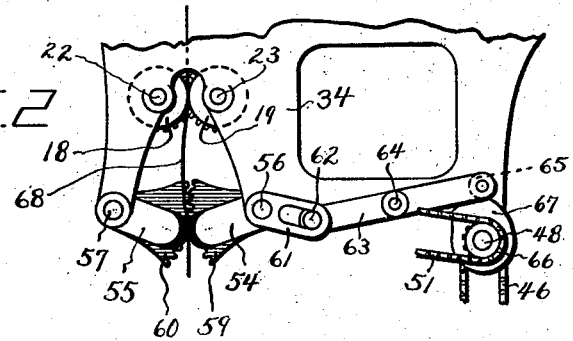

Feb. 22, 1927.
G. A. BRESETT
1,618,167
WEB FEEDING AND CUTTING MECHANISM
Filed Jan. 5, 1926
2 Sheets-Sheet 2

INVENTOR
George A. Bresett
BY Archibald Coy
ATTORNEY

Patented Feb. 22, 1927.

1,618,167

UNITED STATES PATENT OFFICE.

GEORGE A. BRESETT, OF MIDDLETOWN, NEW YORK, ASSIGNOR TO THE BORDEN COMPANY, OF NEW YORK, N. Y., A CORPORATION OF NEW JERSEY.

WEB FEEDING AND CUTTING MECHANISM.

Application filed January 5, 1926. Serial No. 79,389.

The invention relates to an improvement in web feeding and cutting mechanisms.

It is common practice to enclose pieces of confectionery and the like in tin foil. This foil is relatively expensive and it has been proposed to substitute the cheaper aluminum foil for it. Up to the present time, however, the use of aluminum foil in place of tin foil has not been altogether successful because of the difficulty experienced in cutting the aluminum foil. The foil is fed from a roll to the cutting devices of the automatic wrapping machine in which the articles are wrapped, and the cutting devices operate to cut off the requisite length of foil for each article. These cutting devices usually comprise a pair of shear blades, a stationary blade and a movable blade. When the blades are in open position the feed devices operate to advance the predetermined length of foil between the blades which then close upon the foil and sever it. Such is the nature of aluminum foil that it causes the blades to become dull in a relatively short time. Although dull the blades will continue for a long time successfully to sever the foil. When the blades are dull, however, the lower end of the length of foil being fed from the roll adheres to one blade or the other. When this occurs the next length of foil fed forward by the feed rolls causes the lower end of the foil to loop or double so that an imperfect length of foil is cut. Because of this adhering of the lower end of the uncut length of aluminum foil to one or the other of the shear blades after a comparatively short period of operation, aluminum foil as a substitute for tin foil has not gone into general use. The economy effected by using aluminum foil, however, has led to many efforts to produce devices for disengaging the stuck end of the uncut length of foil from the shear blades. So far as I am aware, no successful device has heretofore been produced for this purpose.

The object of the present invention is to provide a web feeding and cutting mechanism with improved means for removing from the cutters the uncut length of foil extending from the feed rolls to the cutters immediately following the cutting operation, so that if the end of the foil adheres to one blade or the other it will be disengaged therefrom and held in position to be properly fed between the open blades on the next actuation of the feed rolls. To this end the invention consists in the improved web feeding and cutting mechanism hereinafter fully described and particularly pointed out in the appended claims.

Figure 4:
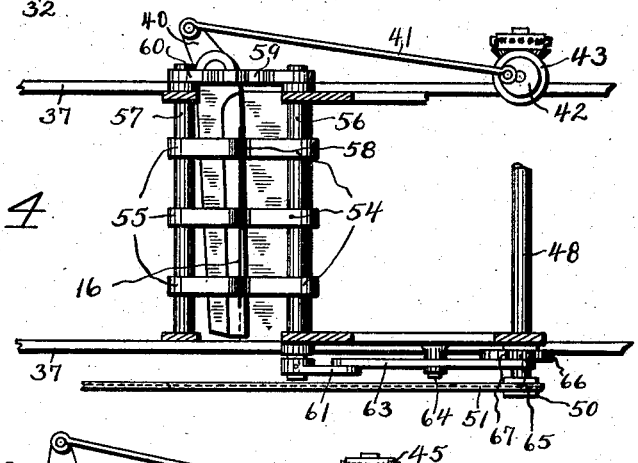
Figure 5:
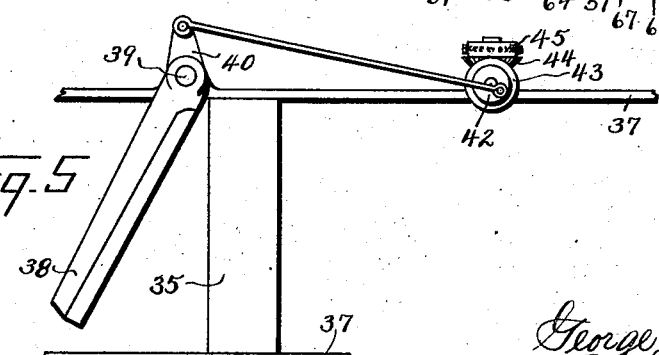

In the accompanying drawings illustrating the preferred form of the invention, Fig. 1 is a side elevation of the improved web feeding and cutting mechanism; Fig. 2 is a side elevation of the devices for lifting the uncut length of foil, the devices being shown in their raised position lifting the foil; Fig. 3 is a plan of the parts shown in Fig. 1; Fig. 4 is a top plan view of the devices for lifting the foil, together with associated parts; and Fig. 5 is a plan of the cutter blades in open position.

In the illustrated embodiment of the invention the improved web feeding and cutting mechanism is shown applied to the frame of a wrapping machine which may be of any usual or preferred construction. The web of aluminum foil to be cut is fed from a roll 11 wound on a core 12 the shaft 13 of which is journaled in the brackets 14 extending downwardly from the longitudinal bars 15 supported on the uprights 10. The length of foil 16, from the lower end of which a predetermined amount is to be cut, passes over an idler roll 17 journaled in the bars 15, and thence passes downwardly between the feed rolls 18 and 19 to the cutting devices which are indicated generally at 20 in Fig. 1.

The feed rolls 18 and 19 are mounted on shafts 22 and 23, respectively, journaled at their outer ends in the frame sections 34 (only one being shown) depending from the bars 15. The rear ends of the shafts 22 and 23 project beyond the frame of the machine and carry the intermeshing gears 24 and 25 which are driven intermittently by means of a gear 26 meshing with the gear 24 and mounted on a stud 27 secured in a bracket 28 depending from the rear bar 15.

To the front face of the gear 26 are secured four slotted arms 29 arranged as a Geneva gear and which are adapted to be engaged and actuated by an arm 30 secured to the shaft 31 journaled in the lower ends of the brackets 14. On the forward end of the shaft 31 is mounted a sprocket wheel 32 over which passes a chain 33 which is continuously driven from a convenient source of power in the wrapping machine.

The foil cutting devices 20 comprise a stationary blade 35 supported on a crosspiece 36 secured at its ends to the longitudinally extending bars 37 supported from the uprights 10 of the frame of the machine, and a movable blade 38 secured to the pin 39 pivoted in the rear bar 37. The pin 39 is provided with an arm 40 connected at its outer end by a link 41 with a crank 42 connected with the miter gears 43 and 44 journaled in the rear bar 37. The gear 44 is provided with a sprocket 45 over which passes the lower end of a chain 46, the upper end of which passes over a sprocket 47 mounted on the rear end of a shaft 48 journaled in the lower ends of the downward projections 49 from the frame sections 34. On the forward end of the shaft 48 is mounted a sprocket 50 over which passes one end of a chain 51, the other end of which passes over a sprocket 52 mounted on the front end of the shaft 31. The timing of the rotation of the arm 30 and the oscillation of the movable blade 38 is such that when the blade 38 is in open position, as shown in Fig. 5, the feed rolls 18 and 19 are actuated to advance a predetermined length of web between the cutter blades. When the feed rolls come to rest due to the disengagement of the arm 30 from the slot of one of the arms 29 of the Geneva gear the blade 38 is actuated to sever the piece of foil positioned between the cutter blades. The foregoing instrumentalities are constructed and operate as is usual in machines of this character.

The devices of the present invention operate to lift the length of foil extending from the feed rolls to the cutter blades immediately following the cutting operation and while the movable blade is still closed upon the stationary blade by exerting a longitudinal pull upon the foil in a direction away from the cutters. In the illustrated embodiment of the invention these devices take the form of two series of oppositely disposed fingers 54 and 55 which are mounted on the shafts 56 and 57, respectively, journaled at their outer ends in a downwardly extending part of the frame sections 34. The free ends of the arms 54 and 55 extend toward each other at a downwardly inclined angle and are tipped with a resilient frictional substance, such as rubber 58, so that when the fingers are raised and brought together on opposite sides of the length of web 16, the frictional engagement of the fingers therewith will lift the web and disengage the lower end thereof from the cutter blades.

The fingers 54 and 55 are simultaneously caused to engage with and lift the length of web 16 by imparting a clockwise motion to the fingers 54 and a counter-clockwise motion to the fingers 55. For this purpose the shaft 56 is provided at its rear end with a segmental gear 59 which meshes with a corresponding segment gear 60 mounted on the rear end of the shaft 57. On the forward end of the shaft 56 is fixed a slotted arm 61 in the slot of which is loosely received a pin 62 projecting forwardly from the inner end of a lever 63 pivoted at 64 on the front frame section 24. The outer end of the lever 63 carries a roller 65 which is in engagement with a cam 66 mounted on the forward end of the shaft 48.

The mode of operation of the improved web feeding and cutting mechanism is as follows: The shaft 31 is constantly driven from the main driving devices of the wrapping machine. The rotation of the arm 30 in connection with the Geneva gear 26 causes the feed rolls 18 and 19 to be intermittently actuated to draw a predetermined length of web from the roll 11 and advance it between the cutter blades 35 and 38 which are now in open position, as shown in Fig. 5. Immediately the predetermined length of web has been advanced between the cutter blades, the movable blade 38 is closed upon the stationary blade 35 and severs the web. Immediately following the closing of the movable blade upon the stationary blade, severing of the predetermined length of web, the uncut length of web 16 extending from the feed rolls to the cutter blades is pulled longitudinally away from the blades by the actuation of the fingers 54 and 55, the cam 66 being so timed with relation to the actuation of the movable cutter blade that the active part 67 thereof engages the roller 65 as the movable cutter blade closes. The crank 31 which actuates the movable cutter blade 38 and the cam 66 which actuates the web lifting fingers 54 and 55, being connected with the shaft 31, are constantly driven. Since, however, they have active and inactive parts, they may be set so that the cutter blades will be in open position when the feed rolls are actuated to advance the predetermined length of web between them and will be in closed position momentarily following the cutting operation while the web lifting fingers are actuated to lift the uncut length of web from the cutters. The action of the web lifting fingers is to pull the lower end of the uncut portion 16 of the web away from the cutter blades. If the lower end of the uncut portion of the web adheres to one blade or the other, it will become disengaged therefrom by a longitudinal pull which will not crinkle the end of the web. It is necessary to lift the end of the web only a short distance above the cutter blades so as to free it therefrom. The amount of lift imparted to the uncut portion of the web is indicated by the bent portion 68 between the web lifting fingers and the feed rolls in Fig. 2. The sole purpose of lifting the length of web 16 being to disengage the lower end thereof from the cutter blades, the web is held raised only momentarily during which time the cutter blade 38 swings to open position. The fingers 54 and 55 then swing downwardly by reason of the fact that the active part 67 of the cam 66 passes out of engagement with the roller 65. The web is now free to be advanced another predetermined length on the next actuation of the feed rolls. Since the lower end of the web is entirely free from the cutter blades the web is properly advanced between the cutter blades.

From the foregoing description it will be understood by those skilled in the art that the invention may be embodied in forms other than that shown in the drawings, an important feature of the invention being to exert a longitudinal pull upon the uncut length of web extending from the feed rolls to the cutter blades to draw the uncut portion of the web away from the blades to prevent the possibility of sticking and crinkling.

Having thus described the invention what I claim as new is:—

1. A web feeding and cutting mechanism comprising, means for supporting a roll of web, a pair of feed rolls between which the web passes, means for actuating the feed rolls to advance a length of web, a pair of cutter blades consisting of a stationary blade and a movable blade, means for actuating the movable blade, and means for exerting a longitudinal pull upon the uncut length of web extending from the feed rolls to the cutter blades in a direction from the cutter blades to the feed rolls to withdraw the end of the uncut portion of the web from the cutter blades.

2. A web feeding and cutting mechanism comprising, means for supporting a roll of web, a pair of feed rolls between which the web passes, a pair of cutter blades, means for actuating the feed rolls to advance a length of web between the cutter blades when they are in open position, means for actuating the cutter blades to sever the length of web, and means operating while the cutter blades are still in closed position following the cutting operation to exert a longitudinal pull upon the length of web extending from the feed rolls to the cutter blades to disengage the end of the web from the cutter blades.

3. A web feeding and cutting mechanism comprising, means for supporting a roll of web, a pair of feed rolls between which the web passes, a pair of cutter blades located below the feed rolls, means for actuating the feed rolls to advance a length of web between the cutter blades when they are in open position, means for actuating the cutter blades to sever the length of web, two series of fingers located between the feed rolls and the cutter blades for engaging the web on opposite sides thereof, and means for actuating the fingers while the cutter blades are still in closed position following the cutting operation to engage the uncut portion of the web and exert a longitudinal pull thereon to lift it from the cutter blades.

4. A web feeding and cutting mechanism comprising, means for supporting a roll of web, a pair of feed rolls between which the web passes, a pair of cutter blades located below the feed rolls, means for actuating the feed rolls to advance a length of web between the cutter blades when they are in open position, and means operative while the cutter blades are still in closed position following the cutting operation to exert a longitudinal pull on the uncut length of web extending from the feed rolls to the cutter blades to lift the lower end thereof clear of the cutter blades.

5. A web feeding and cutting mechanism comprising, means for supporting a roll of web, a pair of feed rolls between which the web passes, a pair of cutter blades located below the feed rolls consisting of a stationary blade and a movable blade, means for intermittently actuating the feed rolls to advance a predetermined length of web between the cutter blades when they are in open position, means for actuating the movable blade to cause it to close upon the stationary blade and sever the predetermined length of web, two series of fingers located between the feed rolls and the cutter blades and arranged to engage the web on opposite sides thereof, connections between the fingers to cause them to operate simultaneously, a cam, connections between the cam and the fingers, and means for actuating the cam while the cutter blades are still in closed position following the cutting operation to cause the fingers to close upon and lift the uncut length of web extending from the feed rolls to the cutter blades.

6. A web feeding and cutting mechanism comprising, cutting devices, means for feeding a length of web to the cutting devices, means for actuating the cutting devices, and means for exerting a longitudinal pull on the strip of web extending from the feeding devices to the cutting devices in a direction from the cutting devices to the feeding devices to remove the end of the web from the cutting devices.

7. A web feeding and cutting mechanism comprising, means for supporting a length of web, a pair of feed rolls between which the web passes, a pair of cutter blades located below the feed rolls, means for actuating the feed rolls to advance a predetermined length of web between the cutter blades when they are in open position, and means located between the cutter blades and the feed rolls and operative after the cutting operation to exert a longitudinal pull on the uncut length of web extending from the feed rolls to the cutter blades to lift the lower end thereof clear of the cutter blades.

GEORGE A. BRESETT.